United States Patent [19]

Prince, Jr. et al.

[11] Patent Number: 4,645,898
[45] Date of Patent: Feb. 24, 1987

[54] POWDER WELDING OF TWO MEMBERS

[75] Inventors: Aaron E. Prince, Jr.; Dale H. Pryor, both of Austin, Tex.

[73] Assignee: Parker Kinetic Designs, Inc., Austin, Tex.

[21] Appl. No.: 726,691

[22] Filed: Apr. 24, 1985

[51] Int. Cl.$^4$ .............................................. B23K 11/32
[52] U.S. Cl. ................................. 219/104; 219/117.1; 219/78.02; 219/53
[58] Field of Search .................. 219/53, 55, 101, 104, 219/78.02, 117.1; 419/48, 52, 54

[56] References Cited

U.S. PATENT DOCUMENTS

| | | | |
|---|---|---|---|
| 933,456 | 9/1909 | Jacobs | 219/55 |
| 1,787,056 | 12/1930 | Spilsbury | 164/54 |
| 2,355,954 | 8/1944 | Cremer | 219/117.1 X |
| 3,623,207 | 11/1971 | Zoso | 29/241 |
| 3,656,946 | 4/1972 | Inque et al. | 219/117.1 X |
| 4,215,260 | 7/1980 | Zollinger | 219/53 |
| 4,414,454 | 11/1983 | Zollinger | 219/53 |

OTHER PUBLICATIONS

Plasser, Franz, "Flash-Butt Welding Using Mobile On-Track Machine" *Railway Gazette International,* Oct. 1970, pp. 388-391.

*Primary Examiner*—E. A. Goldberg
*Assistant Examiner*—C. M. Sigda
*Attorney, Agent, or Firm*—Marcus L. Bates

[57] ABSTRACT

Method and apparatus for joining two elongated members, such as rails, together by holding the rail ends in fixed relationship respective to one another while ramming powder metal between the confronting ends of the rails. Current flow occurs across the confronting faces of the rail and across the compacted powder, thereby elevating the temperature of the marginal rail ends and the compacted metal powder. The rams forge the hot metal powder and hot rail ends into a continuous mass. The method and apparatus can be used for building railroads, repairing defective rail lengths, and welding other elongated members together.

15 Claims, 7 Drawing Figures

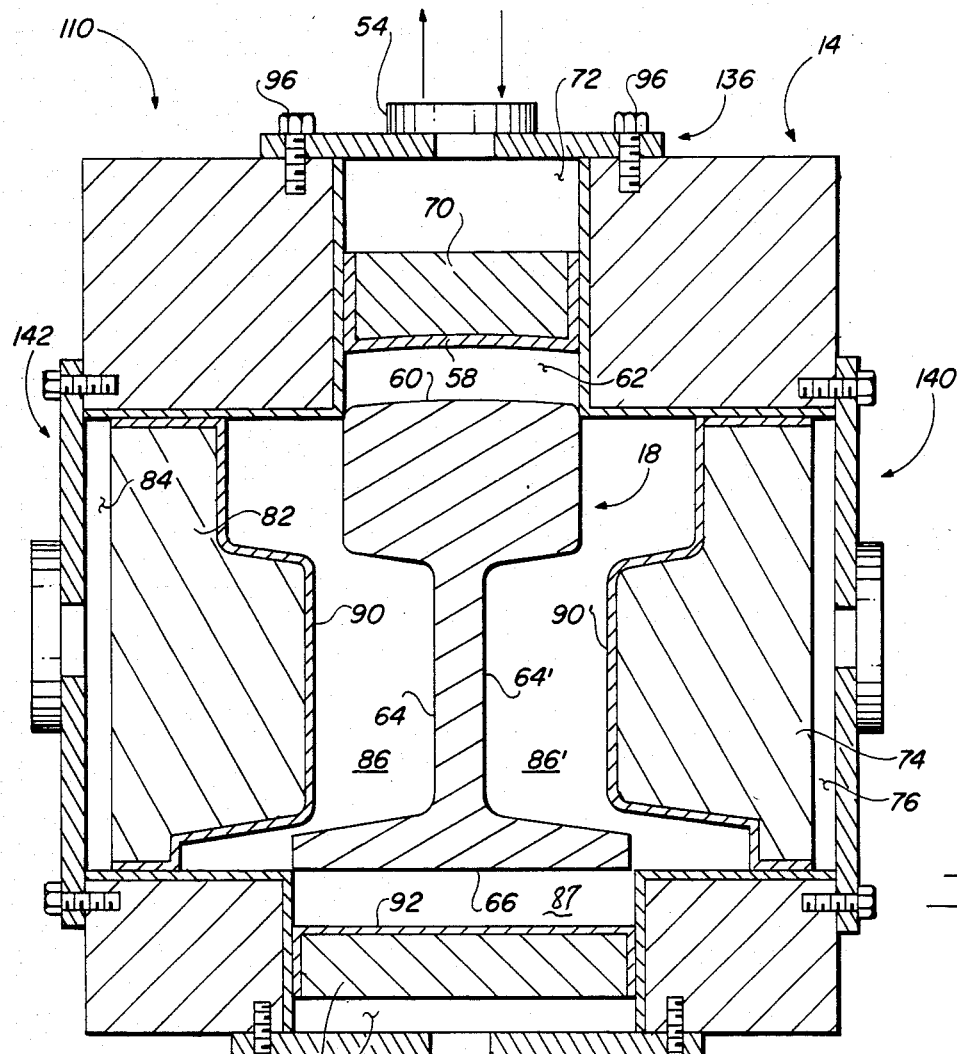
FIG.4
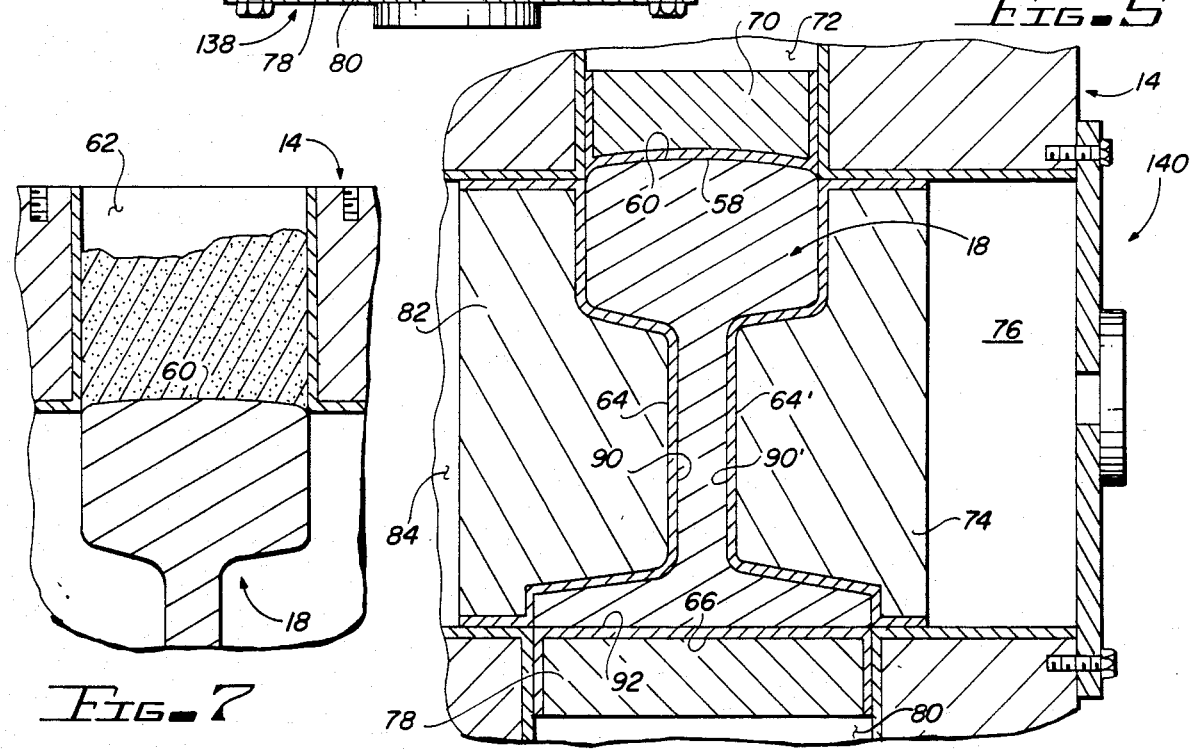
FIG.7
FIG.5

POWDER WELDING OF TWO MEMBERS

BACKGROUND OF THE INVENTION

Electrical arc welding wherein two elongated members are butt welded to one another is known in the art. Elongated members, such as railroad rails, are complex in cross-sectional configuration and for this reason the employment of metal powder in a sintering or fusion process is difficult to carry out because the resultant product is not likely to be of uniform cross-section. Continuous lengths of rail are known, and have advantageously been employed in the past. The prior art sets forth various different apparatus and processes for butt welding elongated members, some of which utilize powder metal to fill the void between confronting rail ends.

The present invention is directed to method and apparatus which overcome many of the drawbacks found in the prior art.

SUMMARY OF THE INVENTION

This invention sets forth method and apparatus by which two axially aligned members, such as rails, can be welded together. The invention is carried out by forming a shaped passageway through a welding fixture through which the members can be passed. The cross-sectional configuration of the passageway corresponds to the cross-sectional configuration of the members to be welded. The marginal ends of the members to be joined are moved into the passageway and anchored into position. The confronting faces of the members are spaced a small distance apart, thereby forming a gap between the confronting members. Means are employed for releasably holding the members in fixed relationship respective to one another and to the fixture, and for filling the void between the rail ends. Means are provided by which current flows into one of the members, across the powdered metal which fills the gap, and into the other member.

A plurality of radially spaced rams are perpendicularly disposed respective to the passageway at a location adjacent to the area where the gap in the members is positioned. The rams further include means by which powder metal can be introduced into the cavity formed between the gap and the rams when the rams are retracted.

The cavity is charged with powder metal after the members are properly positioned respective to one another and to the fixture; pressure is applied to the rams, compressing the powder; a source of current is applied to each of the members, thereby elevating the temperature of the confronting ends of the members and the powder metal contained within the gap, whereupon the temperature of the area to be welded is elevated to a value which enables fusion of the powder to occur. Then the rams further compress the fused powder metal and forge the heated rail ends and powder metal into a continuous mass, thereby welding the members together in a superior manner.

In one form of the invention, the members are rails, and the rams each have a face positioned adjacent to the gap. The face of the rams are made into a configuration which corresponds to the cross-sectional configuration of the rails. When the rams are moved radially towards one another, the confronting faces of the radially spaced rams define a cross-sectional area or void identical or almost identical to the cross-sectional configuration of the rail.

A primary object of the present invention is the provision of method and apparatus by which the ends of elongated members can be welded one to the other.

Another object of the present invention is the provision of method and apparatus by which elongated members are electrically welded together by the employment of powder metal which fuses the ends of the members together.

A further object of the present invention is to provide a method of welding lengths of rails into a continuous rail with a forging-like action, wherein powder metal is forged into an intervening gap at the marginal terminal ends of a pair of opposed hot rails.

An additional object of this invention is the provision of method and apparatus by which axially aligned elongated members are held in spaced relationship while powder metal is interposed therebetween, the rail ends and powder metal are elevated in temperature while a ram apparatus forges the powder metal and rail ends into a continuous solid mass of metal.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

BRIEF DESCRIPTION OF THE DRAWINGS

FIG. 4 is an enlarged, transverse, part cross-sectional view of a modification of the apparatus disclosed in the foregoing figures;

FIG. 5 is a fragmentary, cross-sectional view of the apparatus disclosed in FIG. 4, with some parts thereof being shown in an alternate position of operation;

DETAILED DESCRIPTION OF THE PREFERRED EMBODIMENTS

Figure 1:
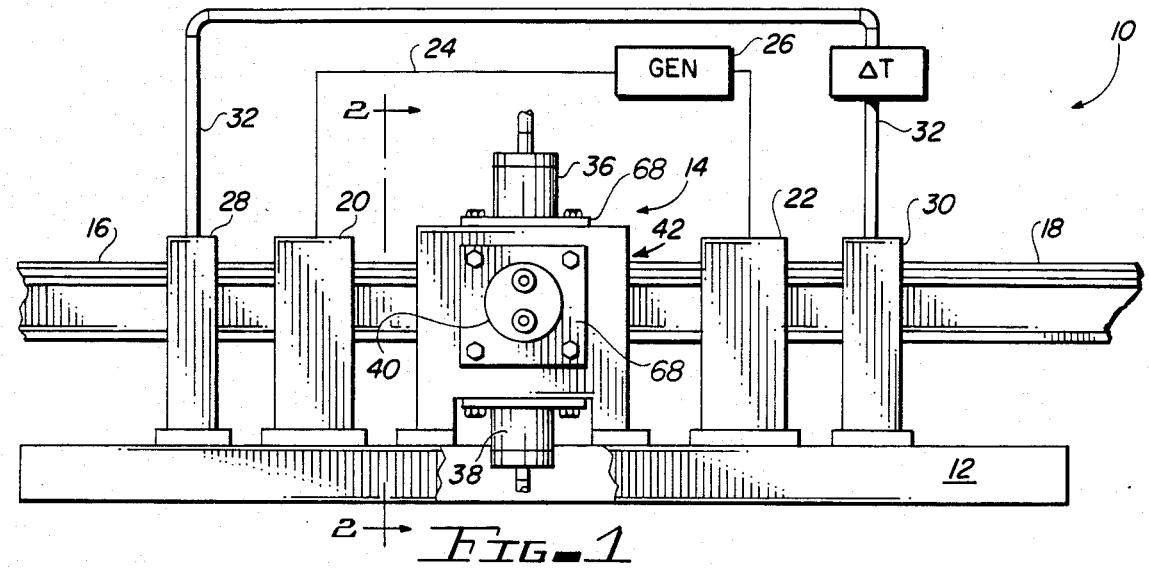
FIG. 1 is a fragmentary, side elevational view of apparatus made in accordance with the present invention; and, by which the present method can be carried out.

In the figures of the drawings, and in particular FIG. 1, there is disclosed apparatus 10 by which the present invention can be practiced. The apparatus 10 includes a main frame 12 to which a fixture 14 is rigidly affixed. The fixture 14 has a passageway extending therethrough, through which elongated members, such as a length of rail 16 and a length of rail 18, can be received.

Clamping means 20 and 22 are affixed to the main frame 12 and are located in spaced relationship on opposed sides of the fixture 14. The clamps 20 and 22 rigidly affix each of the members 16 and 18 respective to one another and to the main frame 12, as well as providing a source of current into each of the members 16 and 18 by means of an electrical conductor 24 connected to a generator 26.

A heat exchange means 28 and 30 is located on either side of the fixture 14 for changing the temperature along a marginal length of each of the members 16 and 18. The heat exchangers 28 and 30 are connected by conduits 32 to a means ΔT by which heat flow into and out of the exchangers 28 and 30 are controlled. The heat exchangers cool a marginal length of the rails 16 and 18 to a value which contracts the rail length an amount equivalent to the expansion of the rail effected by the welding process. The fixture includes a hydraulically actuated upper ram 36, lower ram 38, and opposed rams 40 and 42. The rams are located at about 90° respective to one another and lie along an axis which intersects the longitudinal axis of the fixture passageway.

Figure 2:
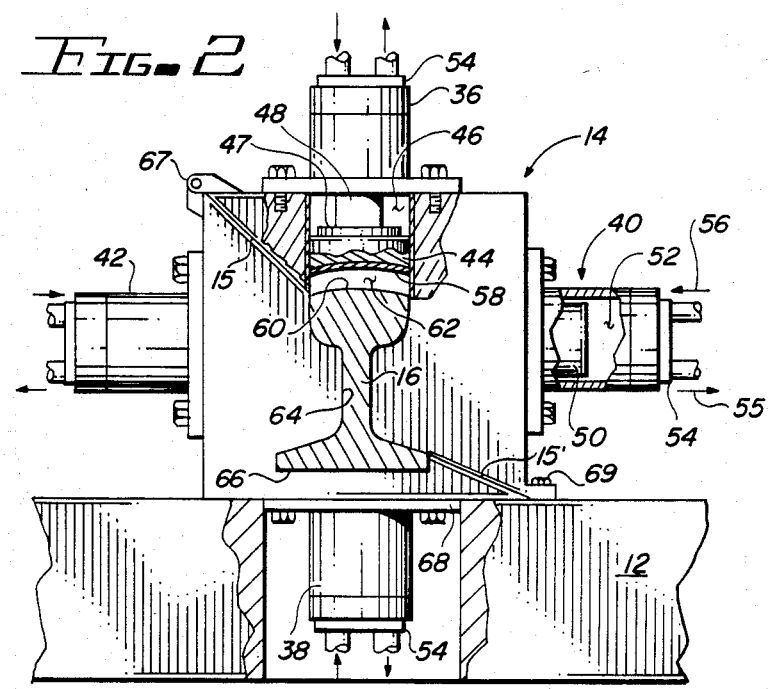
FIG. 2 is a cross-sectional view taken along line 2—2 of FIG. 1; with some parts being broken away therefrom and some of the remaining parts being shown in cross-section.

As seen illustrated in FIG. 2, the rams include a square piston portion 44 which reciprocates within a complementary configured cylinder 46. A connecting rod 48 is affixed to a circular power piston 50. The power piston 50 reciprocates within a working chamber 52. A header 54 provides a means by which power fluid can flow into and out of the working chamber by means of conduits 55 and 56.

In FIG. 2, it will be noted that the face of the square piston 44 is provided with refractory material 58 which will withstand temperatures in excess of 3000° F. and is an electrical insulator. Refractory, insulator materials of this type, which resemble ceramic, are known to those skilled in the art. The ceramic material 58 protects the square piston 44 from the elevated temperatures to which the confronting ends of the members 16 and 18 are subjected, and prevents electrical short circuits between the rail 16 or 18 and the fixture 14.

In the figures of the drawings, the elongated members 16 and 18 to be joined together are specifically illustrated as rails, such as lengths of rails associated with a railroad track. Each rail length has a curved rail face 60 at the top thereof. Numeral 62 indicates part of the powder chamber which is formed between the rail face 60 and the complementary configurated ceramic refractory face 58 of the ram.

As seen in FIG. 2, together with other figures of the drawings, the passageway formed through the fixture 14 has an entrance and an exit thereinto made complementary respective to the members 16 and 18 to be received therewithin. The entrance and exit of the fixture are identical; and, as seen in FIG. 2, comprise an area bounded by edge portions 64, 66, and a similar upper edge portion at 60, so that the rail can be slidably received within the fixture in close tolerance relationship respective to the passageway formed longitudinally therethrough. It should be noted that each of the rams include a cylinder base 68 removably affixed to the main body of the fixture. The fixture 14 is split by an oblique plane indicated by interface 15, 15' so that the upper half of the fixture can be pivoted about hinge 67 when fastener 69 is released, thereby opening the fixture and enabling the fixture to be removed from the welded rail.

Figure 3:
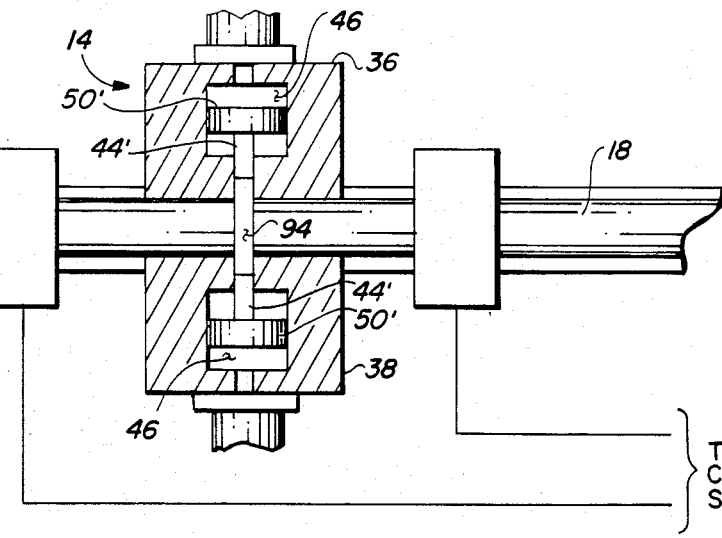
FIG. 3 is a fragmentary, cross-sectional view taken along line 3—3 of FIG. 2.

In operation of the first embodiment of the invention disclosed in FIGS. 1 and 2, the rails are positioned with the confronting marginal ends received within the passageway formed therethrough, with the confronting ends of the rails being slightly spaced apart from one another in the illustrated manner seen at 94 in the schematical representation of FIG. 3. The cylinder base is removed, along with the upper hydraulic ram 36, and powder metal is placed within the intervening space or powder chamber formed between the remaining three piston faces of the ram and between the rails. Next, the upper ram is replaced by bolting the cylinder base back onto the fixture. Clamps, located at 20 and 22, rigidly anchor the opposed members 16 and 18 respective to one another and to the fixture, while at the same time, the clamps 20 and 22 provide an isolated current flow path from the generator, into one of the clamps, through the powder metal, into the opposed member 18, into the other clamp 22, and back to the source of current 26 by means of suitable electrical conductors 24. Where deemed desirable, a marginal length of the rail encompassed by heat exchangers 28 and 30 are cooled, depending upon ambient conditions, thereby compensating for thermal expansion which results from the welding process.

Next, fluid pressure of a first magnitude is effected at 52 and thereafter a flow of current is imposed across the clamps 20 and 22. It is preferred that power fluid flows at fluid conduit 56 into each of the rams prior to establishing a current flow across the powder metal and through the marginal confronting ends of the rails so that the metal powder is compressed and thereafter the temperature thereof is elevated to a forging temperature. The hydraulic pressure is then further increased as the rams cause the piston faces 58 to compress the heated powder metal, thereby forging the ends of the rails together and providing a weld by which the rails 16 and 18 are joined together in a new and novel manner.

Next, the power fluid flow is reversed, thereby retracting the rams and enabling the welded rail length to be telescopingly removed from the fixture, or alternatively the fixture 14 is split along interface 15, 15' and the fixture is removed from the rail.

One commercially available clamp means 20, 22 is available from Parker Kinetic Designs, Inc., Austin, Tex., and is described in patent application Ser. No. 674,843, filed Nov. 26, 1984, to which reference is made for further details thereof.

A preferred source of current 26 is a homopolar generator manufactured by Parker Kinetic Designs, Inc., Austin, Tex.

The heat exchangers 28 and 30 are heat sinks made into a configuration having a passageway formed therethrough which is complementary respective to the cross-sectional area of the member 16 or 18 so that a marginal length of the members 16, 18 at 28 and 30 can be cooled to a value required to achieve the contraction desired. It is considered within the comprehension of those skilled in the art to employ various different cooling media at 28 and 30; and, accordingly, further details thereof are not considered necessary for full comprehension of this invention.

In the embodiment 110 of the invention set forth in FIGS. 4 and 5 of the drawings, the hydraulic rams and fixture previously seen in FIG. 1 is modified to the extent set forth in FIGS. 4, 5, and 7, wherein like or similar numerals refer to like or similar elements. As seen illustrated in FIG. 4, together with FIGS. 5 and 7, the hydraulic upper ram 136 is opposed to a lower hydraulic ram 138, with there additionally being opposed rams 140 and 142 located at the opposed sides of the fixture. Bolts 96 attach a cylinder head and the header 54 to each of the four rams. A free piston 70, 74, 78, 82 is reciprocatingly received within each of the expansible chambers 72, 76, 80, 84. The pistons 70, 74, 78, and 82 have a piston face 58, 90, 90', 92 made complementary respective to the nearest adjacent sidewall of the rail, and jointly form the powder chamber seen at 62, 86, 86', and 87. Each of the piston faces preferably are provided with the illustrated refractory-like material 58, 90, 90', 92 in order to discourage the flow of electrical current and heat from the fused powder into the piston. The sidewalls of the working chamber likewise are provided with refractory-like material.

Figure 6:
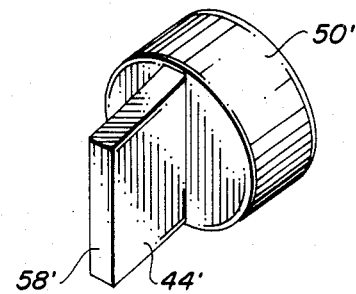
FIG. 6 is a perspective view of part of the apparatus disclosed in FIGS. 2 and 3; and, FIG. 7 is a fragmentary, detailed view of part of the apparatus disclosed in FIGS. 4 and 5.

In FIGS. 3 and 6, numeral 58' indicates the insulated face of the square part 44' of the circular power piston 50'. In operation of the second embodiment of the invention, the cylinder head 136 and piston 70 are removed from the working chamber 72, and suitable powder metal is charged into the cavity formed by the space between the other pistons and the rail. The piston and cylinder head are replaced, and the rams are hydraulically actuated to compress the powder adequately to permit current flow to occur from one member, through the powder, and to the other member to be joined. FIG. 4 illustrates the pistons in the retracted configuration, while FIG. 5 illustrates the configuration of the rams after the forging operation has been completed. FIG. 7 shows the piston 70 and cylinder head 136 removed from the fixture, and a charge of powder metal introduced into the upper chamber 62, 72. Powder metal enters the lower and side chambers through the intervening space 94 (FIG. 3), also called herein a gap.

The following examples are hypothetical:

EXAMPLE I

In a railroad, a 12 foot length of rail has been damaged and must be repaired. The damaged section of rail is removed, and the apparatus of the present invention is positioned with the end of the remaining old rail located at 16, while a new 12 foot piece of rail 18 is placed within the fixture 14 in the manner of FIG. 3, for example. Powder metal is charged into the powder chamber in the before discussed manner, the upper ram replaced, and hydraulic pressure effected on all of the rams. The ram pressure is held while current is applied to the clamp means 20 and 22. The marginal confronting ends of the rail, along with the powder metal, is elevated to approximately 1800° F. whereupon the hydraulic pressure is further increased, causing the four rams to be moved further towards one another and into engagement with the outer surface of the rail. The current is discontinued, and the hydraulic pressure is held for 20 seconds in order to allow the temperature of the weld to be reduced, and thereafter the rams are retracted.

Next, the fixture 14 is moved along the new length of rail until the free end of the new 12 foot length of rail 18 is properly aligned with respect to the powder chamber 94, in the illustrated manner of FIG. 3. The remaining free marginal end of the old rail is placed into the fixture in the illustrated manner of FIG. 3, the upper ram is removed, powder is charged into the powder chambers, the upper ram replaced, and the remaining weld effected in the same manner described above. After the last weld has sufficiently cooled, the fixture is removed from the rail by removing the fastener 69 and splitting the fixture along the plane indicated by numerals 15, 15'.

EXAMPLE II

A continuous rail is desired. Lengths of rail are welded together by moving the fixture along the proposed path of the railroad, while additional lengths of rail are added thereto, with the fixture progressively moving along the continuous rail, sequentially adding new lengths thereto until a rail of the desired length has been fabricated.

The rails can be welded into any desired length at one location, transported to the point of use, and then welded to an existing rail. This enables extremely long rail lengths to be fabricated in a shop and subsequently welded together at the job site.

We claim:

1. Method of welding two elongated metal members together comprising the steps of:

forming a shaped passageway through a welding fixture; and, making said passageway complementary respective to the members to be joined; said passageway having a lengthwise axis and a perpendicular axis;

arranging the members to be joined in confronting relationship and moving the confronting marginal ends of the members to be joined into the passageway and anchoring the members in fixed relationship respective to the fixture, with the confronting ends of the members being spaced from one another;

forming radially spaced rams within the fixture and positioning the rams along the perpendicular axis respective to the lengthwise axis passageway, and placing the rams in communication with the passageway at a location where the members are to be joined;

selecting a powdered metal which can be fused into a mass which is compatible with the composition of the metal members and which can subsequently be forged into part of the joined members;

charging said powdered metal into an area formed between the spaced members and the rams;

attaching a source of current to each member so that current flow can occur from one member, across the powdered metal, and into the other member;

compressing the powder metal by moving the rams toward the members; thereby filling any void that may be present between the confronting faces of the members with compressed powder metal; and, elevating the temperature of the powdered metal and the marginal ends of the members by applying said source of current to the members in an amount to cause the members and powdered metal to become welded together.

2. The method of claim 1 wherein said rams are arranged to have confronting faces of a shape made complementary respective to the shape of the adjacent surface of the members, so that a space that may be formed between the members is filled with powdered metal which is subsequently fused by the current flow and forged by the rams into a member to thereby provide an uninterrupted welded joint.

3. The method of claim 2 wherein the members are rails and the fixture is moved along a projected path of a railroad so that a continuous rail is achieved.

4. The method of claim 3 and further including the steps of moving the rams to compress the powder metal to a first density, and thereafter the current flow into the members is commenced to heat the compacted powder, and thereafter the rams are further actuated thereby causing the temperature of the powder metal to be elevated as the rams are moved towards one another.

5. The method of claim 1 and further including the step of changing the temperature of a marginal length of the members at an area spaced from the confronting ends thereof respective to the ambient temperature prior to carrying out the step of welding to thereby compensate for thermal expansion caused by the welding process.

6. The method of claim 5 wherein the fixture is opened along a plane which extends through the passageway to enable the fixture to be removed from the member.

7. Apparatus for welding two elongated members, comprising:

a fixture, a passageway formed longitudinally through the fixture through which the marginal ends of two elongated members can be extended into opposed confronting relationship respective to one another; means forming said passageway into a configuration which is complementary respective to the shape of the members;

first and second anchoring means by which the members can be releasably fixed respective to one another and to the fixture;

ram means for compacting powder metal which may be located within a medial part of the passageway, said ram means are radially arranged respective to one another and circumferentially arranged about the medial part of the passageway; said ram means have confronting faces which define the cross-sectional configuration of the members when the ram means are extended toward the passageway;

means providing a source of welding current into each of the members;

means for charging powder metal into the passageway at a location between the confronting faces of the ram means, whereby metal powder can be charged into any intervening space that may be formed between the members, the ram means extended toward the members, current applied to the members, whereupon the powder metal becomes fused and is forged into and forms part of the members.

8. The apparatus of claim 7 wherein means are provided for changing the temperature of a marginal length of each of the members at an area spaced from the ram means to thereby compensate for thermal expansion that may occur at the welded area.

9. The apparatus of claim 7 wherein the confronting faces of the ram means jointly define a void having a configuration of the cross-section of the members, and further including means by which the passageway is electrically insulated from the fixture, so that the confronting ends of the members and any powder metal contained within the void is electrically isolated from the fixture.

10. The apparatus of claim 7 wherein each member is a rail, and wherein means are provided for changing the temperature of a marginal length of each of the members to thereby compensate for any thermal expansion that occurs at the welded area during the welding operation.

11. The apparatus of claim 7 wherein the fixture has radially arranged cylinders that communicate with the passageway, said rams are hydraulically actuated pistons reciprocatingly received within said cylinders, wherein the confronting faces of the pistons have electrical and thermal insulation means thereon and jointly define a void having a configuration of the cross-section of the members; and means by which said fixture can be removed from the members.

12. The apparatus of claim 11 wherein means are provided for changing the temperature of a marginal length of each of the members to thereby compensate for any thermal expansion that may occur when the members are welded together;

and means by which powder metal contained within the void is insulated electrically and thermally from the fixture.

13. A rail welder fixture for welding two lengths of rail together, comprising:

a main body having a passageway formed therethrough through which two elongate rails can be extended to place the ends thereof into confronting relationship respective to one another; said passageway has a configuration which is complementary respective to the shape of the rails;

first and second anchoring means by which the rails can be releasably fixed respective to one another and to the fixture;

ram means for forcing powder metal into a medial part of the passageway; said ram means are radially arranged respective to one another and circumferentially arranged about the medial part of the passageway; said ram means have confronting faces; means forming insulation on the confronting faces of said ram means, the confronting faces of said ram means jointly define an area having the cross-sectional configuration of the rails when the rams are extended towards the longitudinal axis of the passageway;

means providing a source of welding current by which electrical energy can flow into one rail, through any powder metal which may be present between the rails, and into the other rail;

means for charging powder metal into the passageway at a location between the confronting faces of the ram means; whereby, metal powder can be charged into the area between the ram means, the ram means extended toward the rails, current applied to the rails, whereupon the powder metal becomes fused into and forms part of the rails.

14. The apparatus of claim 13 wherein means are provided for changing the temperature of a marginal length of each of the rails to thereby compensate for thermal expansion that may occur when current is applied to the rails.

15. The apparatus of claim 14 wherein said fixture includes a cylinder for each said ram; said rams each include a hydraulically actuated piston reciprocatingly received within one said cylinder; and wherein the confronting faces of the pistons jointly define part of said passageway.

* * * * *